3,776,961
3-SUBSTITUTED 4-NITROPHENYL
HALOPHENYL ETHERS
Robert J. Theissen, Westfield, N.J., assignor to Mobil
 Oil Corporation, New York, N.Y.
No Drawing. Continuation-in-part of abandoned application Ser. No. 819,411, Apr. 25, 1969. This application Dec. 23, 1971, Ser. No. 211,787
Int. Cl. C07c 43/22
U.S. Cl. 260—613 R           3 Claims

ABSTRACT OF THE DISCLOSURE 4-nitrophenyl halophenyl ethers having a substituent in the 3-position comprise an effective class of pre- and post-emergence herbicides.

CROSS-REFERENCE TO RELATED APPLICATIONS

This application is a continuation-in-part of copending application Ser. No. 819,411, filed Apr. 25, 1969 and now abandoned.

BACKGROUND OF THE INVENTION

Field of the invention

This invention is concerned with a novel class of herbicidal diphenyl ethers.

Description of the prior art

Various diphenyl ethers have been proposed as herbicides. Some have halogen substitutents in one phenyl ring and only a nitro substituent in the other (second) phenyl ring. Others have substituents in the 2 and 4-positions in the other (second) phenyl ring. Insofar as is now known, diphenyl ethers having halogen (chloro) substituents in one phenyl ring and a 3-substituent and a 4-nitro substituent in the other phenyl ring have not been proposed. Yet, the 3-substituted diphenyl ethers of this invention appear to have outstandingly greater herbicidal activity.

SUMMARY OF THE INVENTION

This invention provides diphenyl ethers having the formula:

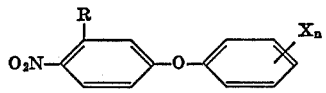

wherein X is halogen, $n$ is 1–5, and R is alkyl ($C_1$–$C_4$), alkoxy ($C_1$–$C_4$), trifluoromethyl, cyano, sulfo, methylsulfonyl, formyl, halogen, methylthio, and dimethylaminosulfonyl.

It also provides a method for controlling plant growth by applying at least one of said diphenyl ethers where control is desired and a composition for controlling plant growth that comprises at least one of said diphenyl ethers and a carrier therefor.

Description of specific embodiments

The diphenyl ethers of this invention are readily prepared by the well-known Ullman ether synthesis, i.e., by reacting the alkali metal salt of a halophenol with a 3-substituted-4-nitro-chloro (or bromo) benzene. The 3-substituted - 4 - nitrohalobenzene is readily prepared by nitrating a 3-substituted-halobenzene. A typical procedure is as follows:

EXAMPLE 1

3 - methyl-4-nitrochlorobenzene (5-chloro-2-nitrotoluene) was prepared in accordance with a procedure of Wright and Jorgensen, J. Org. Chem., 33, 1245 (1968). Fuming nitric acid (1300 ml., sp. gr. 1.52) was added dropwise with stirring during six hours to m-chlorotoluene (500 g.), maintaining the temperature below 5° C. After addition was complete, the reaction mixture was stirred for an additional two hours at 0° C. and refrigerated overnight. After pouring the mixture onto crushed ice, an oil precipitated and was extracted with ether. The ether solution was washed with 5% aqueous sodium hydroxide solution and then with saturated aqueous sodium chloride solution. The ether solution was dried ($Na_2SO_4$) and the solvent removed to yield 709 g. of crude nitrated product. Vacuum distillation gave 572 g. of product, B.P. 69–72° C. at 0.6 mm. Hg. The distillate, as shown by Vapor Phase Chromatography contained 75–80% of the desired product. This distillate could be used, as such, in the Ullman ether synthesis, because the isomeric impurity, 2-methyl-4-nitrochlorophenylene, is extremely less reactive than 3-methyl-4-nitrochlorobenzene.

Non-limiting examples of the diphenyl ethers of this invention are:

3-methyl-4-nitrophenyl-2',4',6'-trichlorophenyl ether;
3-trifluoromethyl-4-nitrophenyl-2',4',6'-tribromophenyl ether;
3-formyl-4-nitrophenyl-2',4',6'-tribromophenyl ether;
3-methoxy-4-nitrophenyl-2',4',6'-trichlorophenyl ether;
3-butoxy-4-nitrophenyl-2',4',6'-tribromophenyl ether;
3-trifluoromethyl-4-nitrophenyl-2',4',6'-trichlorophenyl ether;
3-isopropyl-4-nitrophenyl-2',4',6'-trichlorophenyl ether;
3-cyano-4-nitrophenyl-2',4',6'-trichlorophenyl ether;
3-chloro-4-nitrophenyl-2',4',6'-trichlorophenyl ether;
3-sulfo-4-nitrophenyl-2',4',6'-trichlorophenyl ether;
3-sulfo-4-nitrophenyl-2',4',6'-triiodophenyl ether;
3-methylsulfonyl-4-nitrophenyl-2',4',6'-trichlorophenyl ether;
3-methylsulfonyl-4-nitrophenyl-2',4',6'-trifluorophenyl ether;
3-methylthio-4-nitrophenyl-2',4',6'-trichlorophenyl ether;
3-dimethylaminosulfonyl-4-nitrophenyl-2',4',6'-trichlorophenyl ether;
3-methyl-4-nitrophenyl-2',4'-dichlorophenyl ether;
3-trifluoromethyl-4-nitrophenyl-2',4'-dichlorophenyl ether;
3-methyl-4-nitrophenyl-2',4',5'-trichlorophenyl ether, and
3-trifluoromethyl-4-nitrophenyl-2',4',5'-trichlorophenyl ether.

EXAMPLE 2

A stirred solution of 5-chloro-2-nitrotoluene (25.0 g., 0.146 mole) and the potassium salt of 2',4',6'-trichlorophenol (34.4 g., 0.146 mole) in dimethyl sulfoxide (75 ml.) was heated at 170° for seventeen hours. The cooled reaction mixture was diluted with water (500 ml.) and then extracted with chloroform (3× 100 ml.). The organic solution was concentrated and the major portion of unreacted starting 5-chloro-2-nitrotoluene was steam distilled away from the product. Recrystallization of the residue, first from ethanol, then from 65–100° petroleum ether gave 3.0 g., M.P. 98–108°. Infrared and NMR spectra were both consistent with the structure of 3-methyl-4-nitrophenyl-2',4',6'-trichlorophenyl ether.

EXAMPLE 3

A stirred solution of 5-chloro-2-nitrobenzotrifluoride (30.0 g., 0.133 mole) and the potassium salt of 2',4',6'-trichlorophenol (31.3 g., 0.133 mole) in dimethylformamide (75 ml.) was heated at 150° for five hours. Work-up in a similar manner as in Example 1 gave 19.3 g., M.P. 74–77° of a pale yellow solid, 4-nitro-3-trifluoromethyl-2',4',6'-trichlorophenyl ether.

EXAMPLES 4 THROUGH 9

By analogous reaction procedures, the following diphenyl ethers were also obtained:

$$NO_2-\text{C}_6H_3(X)-O-\text{C}_6H_2(Cl)(Y)(Z)(Cl)$$

| Example | X | Y | Z | M.P., degrees |
|---|---|---|---|---|
| 4 | CHO | Cl | H | 129–132 |
| 5 | OCH$_3$ | Cl | H | 133–138 |
| 6 | CN | Cl | H | 169–174 |
| 7 | Cl | Cl | H | 75–79 |
| 8 | CH$_3$ | H | H | 69–72 |
| 9 | CH$_3$ | H | Cl | 100–103 |

EXAMPLES 10 THROUGH 29

The following additional diphenyl ethers were prepared by analogous reaction procedures as described hereinabove:

| Example | Compound |
|---|---|
| 10 | 3-methyl-4-nitrophenyl-2',4',6'-trichlorophenyl ether. |
| 11 | 3-methyl-4-nitrophenol-2',4',5'-trichlorophenyl ether. |
| 12 | 3-methyl-4-nitrophenyl-2',4'-dibromophenyl ether. |
| 13 | 3-methyl-4-nitrophenyl-2',6'-dichlorophenyl ether. |
| 14 | 3-methyl-4-nitrophenyl-2'-chloro-4'-fluorophenyl ether. |
| 15 | 3-methyl-4-nitrophenyl-2',3'-dichlorophenyl ether. |
| 16 | 3-methyl-4-nitrophenyl-3',4'-dichlorophenyl ether. |
| 17 | 3-methyl-4-nitrophenyl-3',5'-dichlorophenyl ether. |
| 18 | 3-methyl-4-nitrophenyl-2',5'-dichlorophenyl ether. |
| 19 | 3-methyl-4-nitrophenyl-2',4'-dichloro-6'-fluorophenyl ether. |
| 20 | 3-ethyl-4-nitrophenyl-2',4'-dichlorophenyl ether. |
| 21 | 3-ethyl-4-nitrophenyl-2'-chlorophenyl ether. |
| 22 | 3-cyano-4-nitrophenyl-2',3',4',5',6'-pentachlorophenyl ether. |
| 23 | 3-methylsulfonyl-4-nitrophenyl-2',4'-dichlorophenyl ether. |
| 24 | 3-formyl-4-nitrophenyl-2',4'-dichlorophenyl ether. |
| 25 | 3-methylthio-4-nitrophenyl-2',4'-dichlorophenyl ether. |
| 26 | 3-methoxy-4-nitrophenyl-2',4'-dichlorophenyl ether. |
| 27 | 3-trifluoromethyl-4-nitrophenyl-2',4'-dichlorophenyl ether. |
| 28 | 3-trifluoromethyl-4-nitrophenyl-2',4'-dichloro-6'-fluorophenyl ether. |
| 29 | 3-cyano-4-nitrophenyl-2',4'-dichlorophenyl ether. |

The compounds of this invention can be applied in various ways to achieve herbicidal action. They can be applied per se, as solids or in vaporized form, but are preferably applied as the toxic components in pesticidal compositions of the compound and a carrier. The compositions can be applied, as dusts; as liquid sprays, or as gas-propelled sprays, and can contain, in addition to a carrier, additives such as emulsifying agents, binding agents, gases compressed to the liquid state, odorants, stabilizers, and the like. A wide variety of liquid and solid carriers can be used. Non-limiting examples of solid carriers include talc, bentonite, diatomaceous earth, pyrophyllite, fuller's earth, gypsum, flours derived from cottonseeds and nut shells, and various natural and synthetic clays having a pH not exceeding about 9.5. Non-limiting examples of liquid carriers, include water; organic solvents such as alcohols, ketones, amides and esters; mineral oils such as kerosene, light oils, medium oils, and vegetable oils such as cottonseed oil.

In practice, herbicidal application is measured in terms of pounds of herbicide applied per acre. The compounds of this invention are effective herbicides when applied in herbicidal amount, i.e., at rates of between about 0.2 pound and about 10 pounds per acre.

HERBICIDAL EFECTIVENESS

Method of propagating test species

Crabgrass—*Digitaria sanguinalis*
Yellow Foxtail grass—*Setaria glauca*
Johnson grass—*Sorgum Halepense*
Barnyard grass—*Echinochloa crus-galli*
Amaranth pigweed—*Amaranthus retroflexus*
Turnip—*Brassica sp.*
Cotton—*Gossypium hirsutum* var. DPL smooth leaf
Corn—*Zea Mays* var. Golden Bantam
Bean—*Phaseolus vulgaris* var. Black Valentine All crop and weed species are planted individually in 3" plastic pots containing potting soil. Four seeds each of corn, cotton, and snapbean are seeded to a depth equal to the diameter of the seed. All other species are surface seeded and sprinkled with screened soil in an amount sufficient to cover the seed. Immediately after planting, all pots are watered by sub-irrigation in greenhouse trays. Pots for the pre-emergence phase are seeded one day before treatment.

Planting dates for the post-emergence phase are varied so that all seedlings will reach the desired stage of development simultaneously. The proper stage of seedling development for treatment in the post-emergence phase is as follows:

Grasses: 2 inches in height.
Pigweed & Turnip: 1 or 2 true leaves visible above cotyledons.
Cotton: first true leaf 1 inch in length: expanded cotyledons.
Corn: 3 inches–4 inches in height.
Bean: Primary leaves expanded, growing point at primary leaf node.

Method of treatment

Spray applications are made in a hood containing a movable belt and fixed spray nozzle. For passage through the spray hood, one pot of each species (pre-emergence phase) is placed on the forward half of a wooden flat and one pot of established plants (post-emergence phase) is placed on the rear half of the flat. Treatments are moved to the greenhouse after spraying. Watering during the observation period is applied only by sub-irrigation.

Compounds are screened at an initial rate of application equivalent to 8 pounds per acre. Two weeks after treatment, the pre- and post-emergence percent injury is visually rated.

The compounds of Examples 1 through 29 were subjected to herbicidal testing. Dosage and results are set forth in the folowing table. To show the effect of the 2- vs. 3-position, data are included for 2-trifluoro-methyl-4-nitrophenyl-2', 4',6'-trichlorophenyl ether, identified as "Ciba" which was disclosed in South African Pat. No. 67/6579. In the table, the plants are coded as follows:

Crabgrass—CG
Yellow Foxtail grass—YF
Johnson grass—JG
Barnyard grass—BG
Bean—BN
Pigweed—PW
Turnip—TP
Cotton—CT
Corn—CN

TABLE.—PRE/POST-EMERGENCE

| Compounds of Example | Dosage, lbs./acre | CG | YF | JG | BG | PW | TP | CT | CN | BN |
|---|---|---|---|---|---|---|---|---|---|---|
| 2 | 8 | 100/90 | 80/80 | 70/70 | 20/50 | 100/90 | 30/0 | 80/40 | 30/30 | 60/70 |
|  | 2 | 100/90 | 70/90 | 70/90 | 70/70 | 100/100 | 0/30 | 80/80 | 80/30 | 80/100 |
|  | 1 | 90/90 | 50/80 | 20/90 | 0/80 | —/100 | 0/30 | 100/80 | 0/30 | 30/70 |
| 3 | 4 | 90/80 | —/— | 70/70 | 20/30 | —/90 | 0/60 | 80/100 | 50/30 | 100/100 |
| Ciba | 8 | 0/40 | —/— | 20/20 | 0/20 | —/20 | 0/30 | 30/20 | 30/0 | 80/80 |
| 4 | 4 | 20/50 | —/— | 20/70 | 0/30 | 40/100 | 0/100 | 100/100 | 0/20 | 100/100 |
| 5 | 4 | 20/100 | —/— | 0/80 | 0/60 | —/100 | 0/50 | 100/100 | 100/100 | 100/100 |
| 6 | 8 | 0/30 | —/— | 40/30 | 0/20 | 40/90 | 0/40 | 80/0 | 80/0 | 80/0 |
| 7 | 8 | 90/50 | —/— | 60/80 | 40/60 | —/— | 20/60 | 50/50 | 0/30 | 70/60 |
| 8 | 4 | 100/90 | —/— | 100/90 | 100/90 | —/— | 40/60 | 30/90 | 50/50 | 80/100 |
|  | 2 | 100/80 | 90/50 | 90/30 | 100/40 | —/80 | 20/20 | 50/80 | 20/20 | 100/100 |
| 9 | 8 | 80/80 | —/— | 60/80 | 0/40 | —/— | 30/20 | 60/90 | 30/30 | 80/60 |
| 10 | 4 | 70/50 | —/30 | 40/30 | 30/20 | 0/— | 30/30 | 30/30 | 50/30 | 60/50 |
| 11 | 4 | 70/30 | —/20 | 30/20 | 20/20 | —/— | 30/20 | 50/40 | 0/20 | 80/50 |
| 12 | 4 | 80/50 | —/— | 70/30 | 0/30 | 90/100 | 0/30 | 50/30 | 0/20 | 100/100 |
| 13 | 8 | 0/30 | —/— | 0/20 | 0/20 | 0/0 | 0/0 | 0/0 | 0/20 | 100/80 |
| 14 | 8 | 100/60 | —/— | 90/90 | 70/30 | —/— | 30/20 | 30/40 | 60/30 | 0/60 |
|  | 4 | 100/— | —/— | 90/— | 60/— | —/— | 40/— | 100/— | 60/— | 0/— |
|  | 2 | 70/30 | 80/— | 80/30 | 30/40 | 100/60 | 20/60 | 30/60 | 80/30 | 100/50 |
| 15 | 8 | 40/30 | 20/30 | 0/30 | 0/30 | 0/50 | 20/40 | 80/50 | 0/20 | 100/70 |
| 16 | 8 | 0/30 | 0/40 | 0/40 | 0/30 | 0/20 | 20/30 | 100/60 | 30/0 | 80/50 |
| 17 | 8 | 0/30 | 20/40 | 0/30 | 0/30 | 0/40 | 20/30 | 80/50 | 30/20 | 90/60 |
| 18 | 8 | 0/20 | 20/20 | 0/20 | 20/30 | 20/0 | 20/20 | 0/60 | 30/10 | 0/30 |
| 19 | 8 | 100/50 | —/— | 100/— | 100/— | —/— | 90/100 | 50/100 | 80/— | —/— |
|  | 4 | 100/— | —/— | 90/— | 90/— | —/— | 60/— | 40/— | 40/— | —/— |
|  | 2 | 100/— | —/— | 80/— | 70/— | —/— | 20/— | 30/— | 30/— | —/— |
|  | 1 | 100/90 | —/— | 90/— | 70/— | 100/— | 20/20 | 40/50 | 0/— | —/— |
|  | ½ | 80/70 | —/— | 60/— | 50/— | 100/— | 50/40 | 0/30 | 40/— | —/— |
| 20 | 2 | 30/40 | —/— | 0/30 | —/20 | 60/90 | 0/30 | 50/40 | 0/20 | 90/100 |
| 21 | 4 | 20/60 | 0/— | 0/30 | 20/30 | —/— | 20/80 | 0/20 | 0/20 | 0/40 |
| 22 | 8 | 20/30 | 20/— | 20/30 | 20/30 | —/— | 20/40 | 0/60 | 0/30 | 0/60 |
| 23 | 10 | 0/30 | 20/— | —/— | —/— | —/— | 0/100 | —/60 | —/— | —/100 |
| 24 | 4 | 0/50 | —/— | 0/30 | 0/30 | —/— | 40/100 | 30/100 | 0/30 | 0/70 |
| 25 | 8 | 30/30 | —/— | —/— | —/— | —/— | 60/60 | —/60 | —/— | —/90 |
| 26 | 10 | 90/100 | —/— | 90/— | 80/— | 100/— | 40/90 | 0/70 | 0/— | —/— |
|  | 4 | 80/90 | —/— | 70/— | 60/— | 100/— | 40/70 | 0/70 | 0/— | —/— |
|  | 8 | 90/40 | —/— | 70/30 | 40/20 | —/— | 60/90 | 50/70 | 20/20 | 30/80 |
| 27 | 8 | 100/20 | —/— | 80/— | 70/— | —/— | 80/90 | 80/90 | 60/— | —/— |
| 28 | 4 | 90/— | —/— | 40/— | 20/— | —/— | 0/— | 0/— | 40/— | —/— |
|  | 2 | 80/— | —/— | 0/— | 0/— | 20/— | 20/— | 20/— | 30/— | —/— |
| 29 | 8 | 0/30 | —/— | 50/30 | 20/30 | 80/100 | 20/70 | 30/70 | 0/70 | 80/— |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:
1. Diphenyl ethers having the formula:

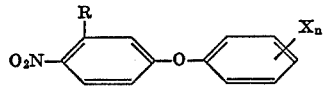

wherein X is halogen, $n$ is 1–5, and R is alkoxy $(C_1-C_4)$.

2. A diphenyl ether of claim 1, wherein $n$ is 3, X is chlorine on the 2′,4′,6′-positions, and R is methoxy.

3. A diphenyl ether of claim 1, wherein $n$ is 2, X is chlorine on the 2′,4′-positions, and R is methoxy.

References Cited

UNITED STATES PATENTS

| 3,454,392 | 7/1969 | Kato et al. | 260—612 R X |
| 3,401,031 | 9/1968 | Inove et al. | 260—612 R X |
| 3,322,525 | 5/1967 | Martin et al. | 260—612 R X |

BERNARD HELFIN, Primary Examiner

U.S. Cl. X.R.

260—465 F, 465 G, 512 C, 600, 609 F, 556 AR, 607 A, 612 R; 71—98, 103, 105, 123, 124

UNITED STATES PATENT OFFICE
CERTIFICATE OF CORRECTION

Patent No. 3,776,961   Dated December 4, 1973

Inventor(s) Robert J. Theissen

It is certified that error appears in the above-identified patent and that said Letters Patent are hereby corrected as shown below:

Column 2, line 24 "nitrochlorophenylene" should be --nitrochlorobenzene--.

Signed and sealed this 6th day of August 1974.

(SEAL)
Attest:

McCOY M. GIBSON, JR.
Attesting Officer

C. MARSHALL DANN
Commissioner of Patents

Disclaimer 3,776,961.—*Robert J. Theissen*, Westfield, N.J. 3-SUBSTITUTED 4-NITROPHENYL HALOPHENYL ETHERS. Patent dated Dec. 4, 1973. Disclaimer filed July 26, 1976, by the assignee, *Mobil Oil Corporation*.
Hereby enters this disclaimer to claims 1 and 3 of said patent.
[*Official Gazette January 11, 1977.*]